(12) United States Patent
Ahn et al.

(10) Patent No.: US 8,059,397 B2
(45) Date of Patent: Nov. 15, 2011

(54) PORTABLE TERMINAL WITH SPRING MODULE

(75) Inventors: Sung-Ho Ahn, Seoul (KR); Young-In Cho, Suwon-si (KR); Han-Gyu Hwang, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 149 days.

(21) Appl. No.: 12/547,579

(22) Filed: Aug. 26, 2009

(65) Prior Publication Data

US 2010/0103597 A1    Apr. 29, 2010

(30) Foreign Application Priority Data

Oct. 28, 2008  (KR) .................. 10-2008-0105800
Jul. 28, 2009  (KR) .................. 10-2009-0068901

(51) Int. Cl.
*H05K 7/12*          (2006.01)
(52) U.S. Cl. ............ 361/679.56; 361/679.01; 455/575.4
(58) Field of Classification Search ............. 361/679.01, 361/679.02, 679.09, 679.3, 679.56, 679.19, 361/727; 455/575.1, 575.4, 90.3; 267/155, 267/165, 167, 178, 179, 180, 182, 166
See application file for complete search history.

(56) References Cited

U.S. PATENT DOCUMENTS

| | | | |
|---|---|---|---|
| 2005/0197173 A1* | 9/2005 | Wee et al. ................. | 455/575.4 |
| 2006/0025184 A1* | 2/2006 | Cho et al. ................. | 455/575.4 |
| 2007/0082718 A1* | 4/2007 | Yoon et al. ............... | 455/575.4 |
| 2010/0039754 A1* | 2/2010 | Cheng ...................... | 361/679.01 |
| 2010/0124954 A1* | 5/2010 | Horng ...................... | 455/575.4 |
| 2010/0237550 A1* | 9/2010 | Kubota ..................... | 267/159 |

FOREIGN PATENT DOCUMENTS

| | | |
|---|---|---|
| CN | 201184384 | 1/2009 |
| DE | 10 2006 052832 | 11/2007 |
| KR | 10-0640321 | 10/2006 |
| WO | WO 2007035008 A1 * | 3/2007 |
| WO | WO 2007137546 A1 * | 12/2007 |
| WO | WO 2009/038371 | 3/2009 |

* cited by examiner

*Primary Examiner* — Jinhee Lee
*Assistant Examiner* — Ingrid Wright
(74) *Attorney, Agent, or Firm* — Cha & Reiter, LLC

(57) ABSTRACT

A sliding-type portable terminal including a first housing and a second housing linearly movably coupled to the first housing face-to-face includes a spring module for opening/closing the first and second housings. The spring module includes at least a pair of asymmetrical S-shaped wires each including a first bend and a second bend extending from the first bend and having a greater curvature than the first bend. The spring module of the portable terminal provides a reduced thickness because of the spring action in the portable terminal, contributing in particular to an overall reduction in thickness of a sliding-type portable terminal and permit smooth opening/closing of the portable terminal.

29 Claims, 16 Drawing Sheets

PORTABLE TERMINAL WITH SPRING MODULE

CLAIM OF PRIORITY

This application claims the benefit under 35 U.S.C. §119(a) from a Korean Patent Application filed in the Korean Intellectual Property Office on Oct. 28, 2008 and assigned Serial No. 10-2008-0105800, and Jul. 28, 2009 and assigned Serial No. 10-2009-0068901, the entire disclosure of which are hereby incorporated by reference in its entirety.

BACKGROUND OF THE INVENTION

1. Field of the Invention

The present invention relates to a portable terminal such as a cellular phone and a Personal Digital Assistance (PDA). More particularly, the present invention relates to a sliding-type portable terminal, and improvements in the housing of such devices that permit a decrease in thickness.

2. Description of the Related Art

In general, portable terminals may be classified into bar-type terminals, flip-type terminals and folder-type terminals according to their appearance.

The bar-type terminal has a single body housing, in which a data input/output means and a mouthpiece/earpiece part are mounted thereon. The flip-type terminal includes a body, a flip and a hinge module for pivotally coupling the flip to the body. The folder-type terminal includes a body, a folder and a hinge module for rotatably coupling the folder to the body. Among these portable terminals, the folder-type terminal is the most popular in the portable terminal market, as a data input/output means and a mouthpiece/earpiece part are arranged on a body and a folder in a distributed manner so that the terminal is easier to carry and use than the other types.

Meanwhile, desires of users for external shapes of terminals are becoming increasingly diversified in line with the increased use of the portable terminals in general. To meet the desires of users, portable terminals having new outward shapes have appeared, such as sliding-type and swing-type terminals. Among them, the sliding-type portable terminals have seen increases in its market share beyond that of the folder-type terminal due to the easy of use in an opening/closing operation.

Recently, as multimedia functions for portable terminals have increased, which include watching moving images and broadcast viewing-related functions, display devices of the portable terminals are increasing in size. Because of this demand for increased display size, there is a limit in minimizing the overall size of portable terminals, and attempts to minimize the size of portable terminals are now focusing on reducing a thickness of such portable terminals.

Despite the realization that most attempts to minimize the overall size of portable terminals are focusing on reducing the thickness of the terminals, since the sliding-type portable terminal has a structure in which a pair of housings and a sliding module for coupling the housings are stacked up, facing each other, there are many difficulties in attempting to reduce terminal thickness.

SUMMARY OF THE INVENTION

An exemplary aspect of the present invention is to provide a sliding-type portable terminal that is suitable for miniaturization, and is lightweight and can make full use of multimedia functions.

Another exemplary aspect of the present invention provides a sliding-type portable terminal that is small and lightweight and can offer convenience in an opening/closing operation unknown heretofore.

According to still another exemplary aspect of the present invention, there is provided a portable terminal including a first housing and a second housing linearly movably coupled to the first housing face-to-face. The portable terminal includes a spring module with asymmetrical S-shaped wires each including a first bend and a second bend extending from the first bend and having a greater curvature than the first bend.

Preferably, in an exemplary aspect of the invention, the spring module may be formed by combining the wires in a pair. The spring module may be formed such that a second bend of a first wire is arranged to wrap up a first bend of a second wire, and a second bend of the second wire is arranged to wrap up a first bend of the first wire.

Preferably, in another exemplary aspect of the invention, the spring module has a symmetric S-shape when the wires are combined with each other, and cross sections of the wires are rectangular.

Preferably, in still another exemplary aspect of the invention, in the portable terminal with the spring module, elasticity accumulated in the spring module changes when curvatures of the first and second bends change by a linear movement of the second housing.

Preferably, the spring module can be installed such that one end of the spring module is supported on the first housing, another end is supported on the second housing, and both ends of the spring module approach to or get away from each other when curvatures of the first and second bends change by the linear movement of the second housing.

Also, the spring module can be installed such that one end of the spring module is supported on the first housing, another end is supported on the second housing, and the spring module provides elasticity that acts in a direction of keeping its both ends away from each other.

Preferably, in the multiple wire spring module, each of the wires further includes a straight line portion extending in a straight line, and the straight line portion connects the first and second bends to each other between the first and second bends.

Also, in the spring module with these multiple wires, one end of the spring module is supported on the first housing, another end is supported on the second housing, and the spring module provides elasticity that acts in a direction of keeping its both ends away from each other.

Preferably, the straight line portion of the spring module extends slantingly with respect to a radius direction of a curvature of each of the first and second bends. Also, the straight line portion extends along a radius direction of any one of curvatures of the first and second bends, and extends slantingly with respect to a radius direction of another curvature.

Preferably, the spring module may further include a third wire interposed between the first and second wires. The third wire has two bends having the same curvature, and each of the bends of the third wire is arranged to wrap up a first bend of any one of the first and second wires and to be wrapped up by a second bend of another one of the first and second wires.

Also, the third wire has two bends having the same curvature, and the bends can be connected to each other by a straight line portion extending straight therebetween.

Preferably, the spring module further may include third and fourth wires, which are interposed in a pair between the first and second wires.

Preferably, each of the third and fourth wires is an asymmetrical S-shaped wire which includes a third bend, and a fourth bend that is connected to the third bend and has a greater curvature than the third bend. The spring module is arranged such that the fourth bend of the third wire wraps up the third bend of the fourth wire, and the fourth bend of the fourth wire wraps up the third bend of the third wire.

Preferably, when the asymmetrical S-shaped first, second, third and fourth wires are connected to one other, the spring module has a symmetrical S-shape.

Preferably, the spring module further includes support members provided on both ends thereof, and are supported on the first and second housings to provide elastic force. The support members can be made of a synthetic resin material or a metallic material, and are coupled to the first or second housing by coupling members such as rivets, or by support protrusions formed on the support members.

Other exemplary aspects, advantages, and salient features of the invention will become more apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will become more apparent from the following description taken in conjunction with the accompanying drawings, in which.

Throughout the drawings, the same drawing reference numerals will be understood to refer to the same elements, features and structures.

DETAILED DESCRIPTION

The following description with reference to the accompanying drawings is provided to assist a person of ordinary skill in the art with a comprehensive understanding of exemplary embodiments of the PORTABLE TERMINAL WITH SPRING MODULE invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness when their inclusion could obscure appreciation of the claimed invention by a person of ordinary skill in the art.

The terms and words used in the following description and claims are not limited to the bibliographical meanings, but, are merely used by the inventors to enable a clear and consistent understanding of the invention. Accordingly, it should be apparent to those skilled in the art that the following description of exemplary embodiments of the present invention are provided for illustrative purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
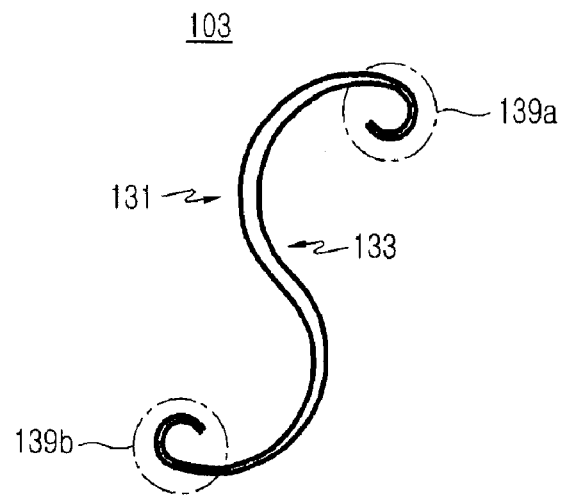
FIG. 1 is a plan view illustrating a spring module for a portable terminal according to an exemplary embodiment of the present invention.
Figure 2:
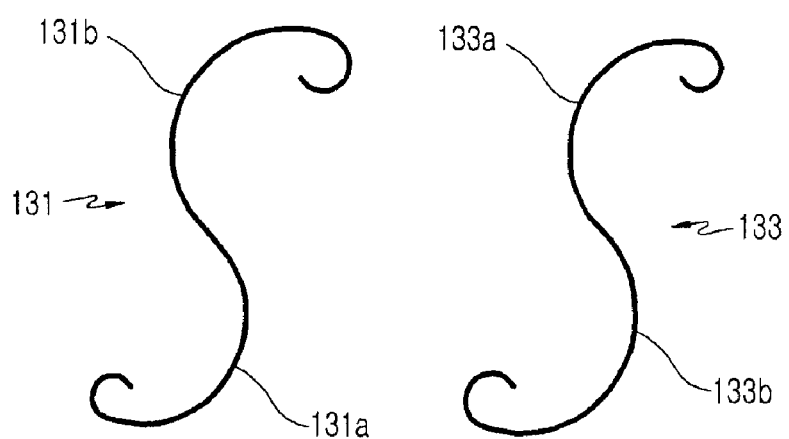
FIG. 2 is a plan view illustrating disassembled wires of the spring module shown in FIG. 1.

FIGS. 1 and 2 illustrate a spring module 103 of a portable terminal 100 (shown in FIG. 3) according to an exemplary embodiment of the present invention, and FIGS. 3 to 6 illustrate stages of a process before and after the spring module 103 shown in FIG. 1 is assembled into the portable terminal 100, and provide an illustration of one particular way the spring module 103 according to the present invention operates in an opening/closing operation of the portable terminal 100.

In the following description of an exemplary embodiment of the present invention, the portable terminal 100 is partially illustrated throughout FIGS. 3 to 6. Since various external structures of the portable terminal 100 are disclosed in Korean Patent Registration No. 640,321 (US Patent Publication No. 2006/0084303) filed by and granted to the applicant of this application, the U.S. Patent Publication being incorporated by reference as background material, only a part of the portable terminal 100 is illustrated in the annexed drawings for simplicity. Although a sliding module for coupling the housings 101 and 102 of the portable terminal 100 may be separately made, its structure can also be easily understood from the aforementioned U.S. Patent Publication and thus a detailed description thereof will be omitted.

Figure 3:
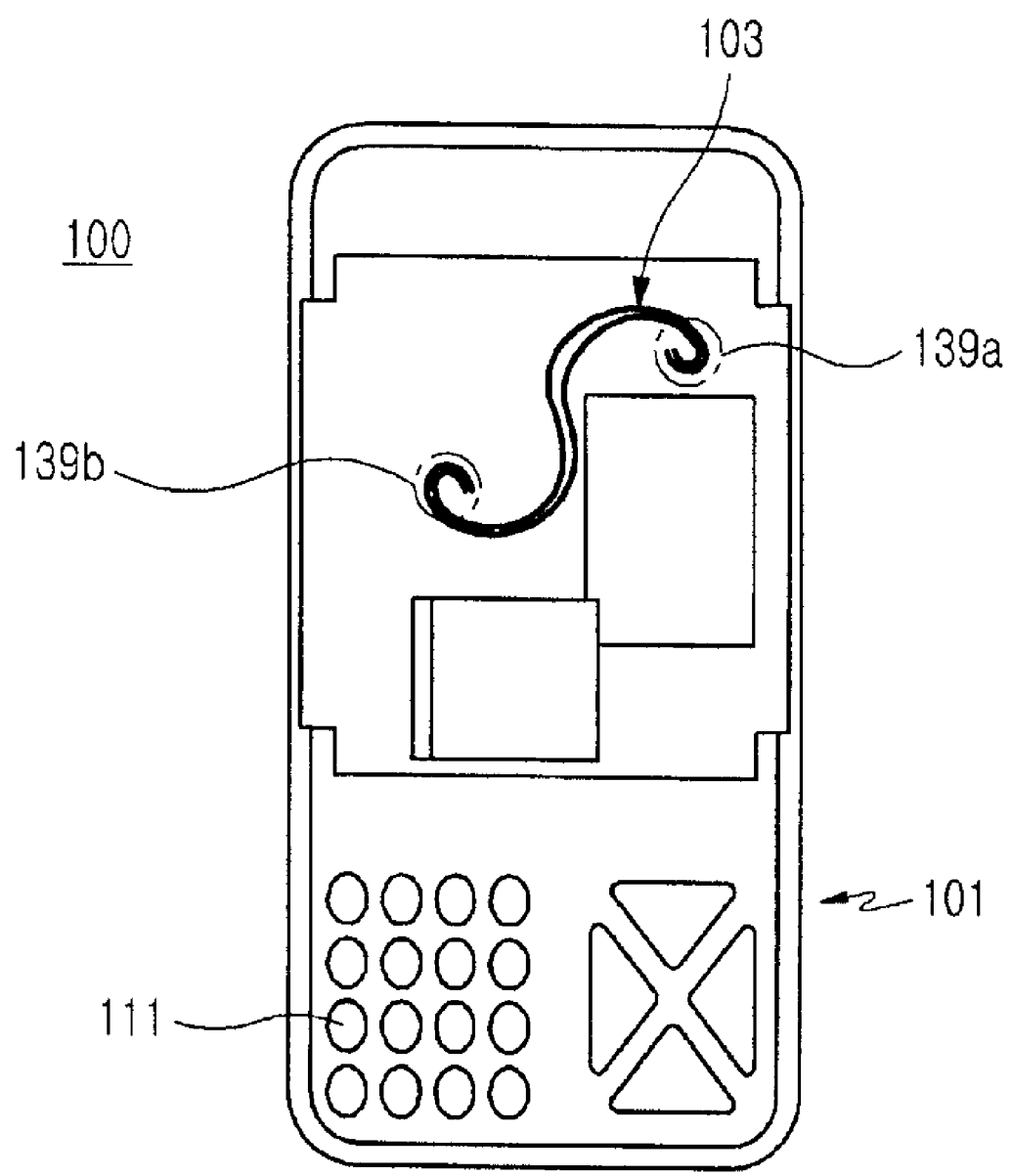
FIG. 3 is a plan view illustrating a situation before the spring module shown in FIG. 1 is assembled in a portable terminal.

Referring now to FIGS. 3 to 6, the portable terminal 100 includes a first housing 101 and a second housing 102 (FIG. 5A), which is coupled to the first housing 101 face-to-face, the second housing being able to move linearly in a longitudinal direction of the first housing 101. In FIGS. 3 and 4A, the second housing 102 is not shown to illustrate the spring module 103 clearly, but in FIGS. 5A and 6A, the second housing 102 is illustrated in perforated line to show an interrelation between the sliding movement of the second housing 102 and the operation of the spring module 103. A keypad 111 is installed in the first housing 101, and opened/closed by a sliding movement of the second housing 102. A display device (not shown) is typically installed in the second housing 102, and a user may activate the display device regardless of the sliding movement of the second housing 102. In addition to the keypad 111, a key for activating the display device may be further installed, and the display device may be composed of a touch screen.

If the portable terminal 100 includes a telephone function for a voice communication, a microphone may be installed in the first housing 101 and a speakerphone may be installed in the second housing 102, providing a mouthpiece and an earpiece for a voice call.

Exemplary structure, installation mechanism and operation of the spring module 103 will now be described below with further reference to FIGS. 1 and 2.

Referring to FIGS. 1 and 2, the spring module 103 is a structure made by combining a pair of wires 131 and 133, which include first bends 131$a$ and 133$a$, and second bends 131$b$ and 133$b$, respectively. The second bends 131$b$ and 133$b$ extend from one ends of the first bends 131$a$ and 133$a$, and have a greater curvature than the first bends 131$a$ and 133$a$. Therefore, the wires 131 and 133 have an asymmetrical S-shape. The spring module 103 is formed by combining such wires, and when the wires 131 and 133 are combined with each other, the spring module 103 has a symmetric S-shape. The term "combined" means arranging the ends at least in pairs so at least to come in partial contact with each other, and the wires may be soldered, welded, crimped, glued, magnetized, aligned, etc., just to name a few possibilities.

More specifically, the second bend 131$b$ of the first wire 131 is arranged to wrap up the first bend 133$a$ of the second wire 133 at the outskirts, and the second bend 133$b$ of the second wire 133 is arranged to wrap up the first bend 131$a$ of the first wire 131 at the outskirts. In this state, the spring module 103 is finished by joining both ends of the wires 131 and 133 to each other. As a result, in the final product, the spring module 103 has a symmetric S-shape.

The wires 131 and 133 are generally manufactured to have a circular cross-section. However, it has been shown that wires having a rectangular cross section could be manufactured thinner than the wires having the circular cross section, in providing the same elastic force. Therefore, by forming the spring module 103 using the wires having the rectangular cross section, it is possible to contribute to reducing thickness of the spring module 103, especially thickness of the portable terminal 100.

The spring module 103 is interposed between the first and second housings 101 and 102, and its one end is supported on the first housing 101 while the other end is supported on the second housing 102, providing an elastic force that acts in a direction of keeping the both ends away from each other.

FIG. 3 illustrates a situation before the spring module 103 is assembled in the portable terminal 100. The situation illustrated in FIG. 3 represents a state where no external force is applied to the spring module 103 and the spring module 103 also has accumulated no elastic force.

Figure 5A:
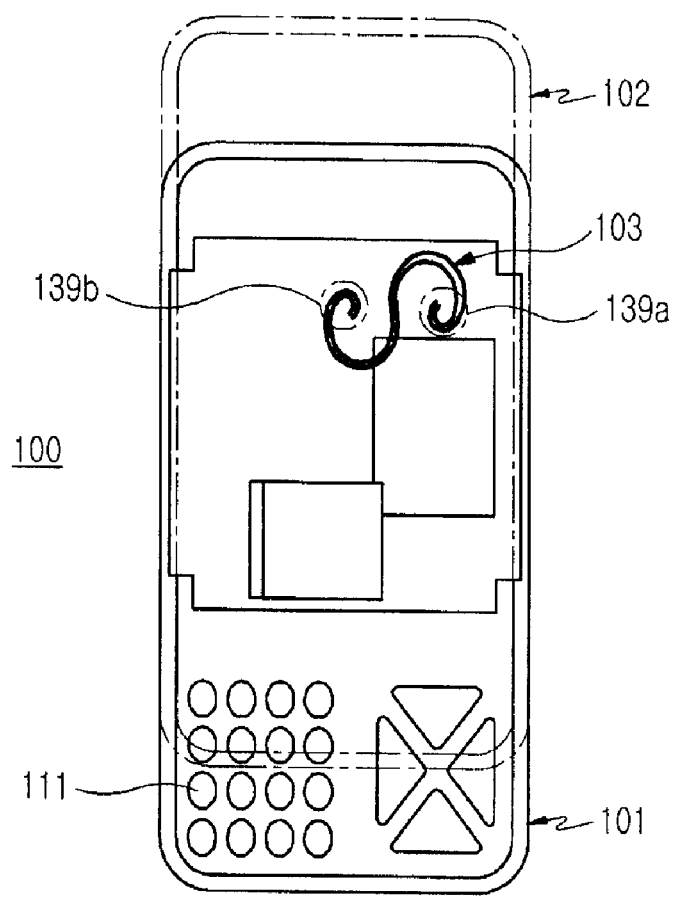
FIG. 5A is a plan view illustrating a situation in which the second housing shown in FIG. 4 slidingly moves.
Figure 5B:
FIG. 5B is a plan view illustrating the spring module shown in FIG. 5A.
Figure 6A:
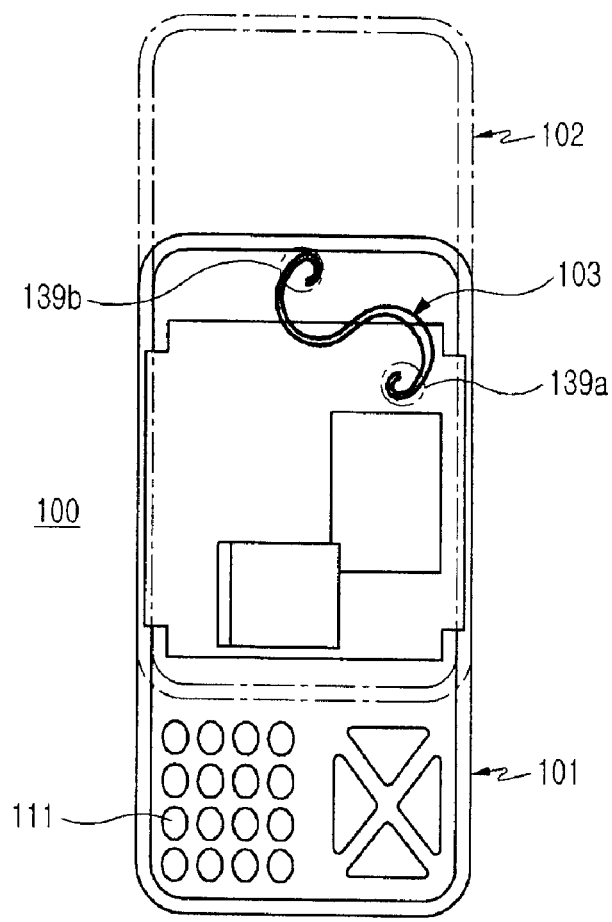
FIG. 6A is a plan view illustrating a situation in which the second housing shown in FIG. 4 slidingly moves to open up a keypad.
Figure 6B:
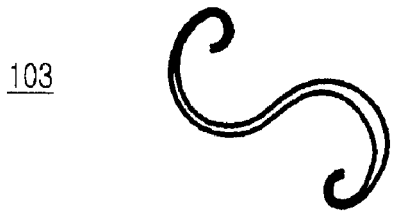
FIG. 6B is a plan view illustrating the spring module shown in FIG. 6A.

In FIGS. 4 to 6, the spring module 103 is separately illustrated in sub-drawings (b), to show only the enlarged spring module 103 in the portable terminal shown in sub-drawings (a).

Figure 4A:
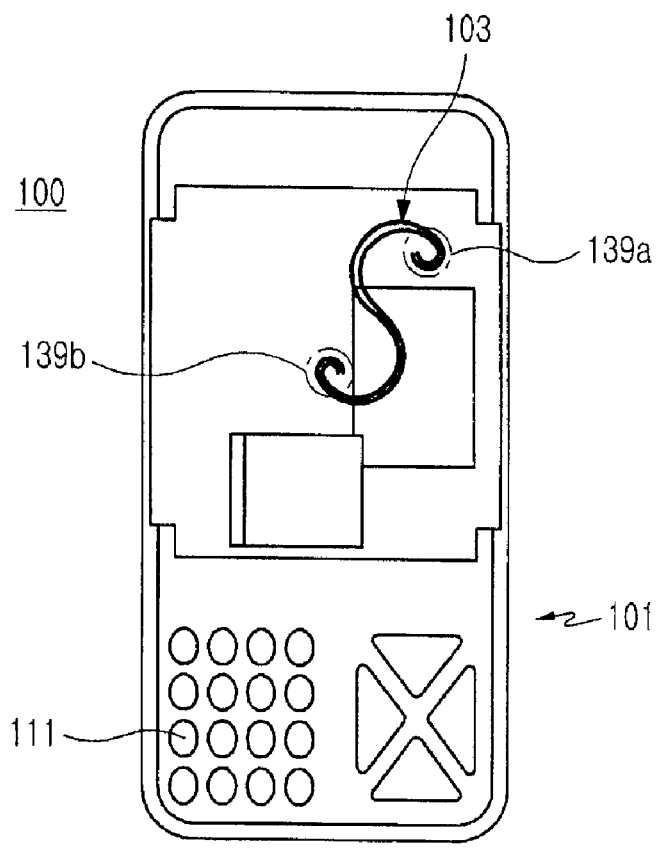
FIG. 4A is a plan view illustrating a situation after the spring module shown in FIG. 1 is assembled in a portable terminal.

For example, FIG. 4A illustrates a situation in which the first and second housings 101 and 102 are in an overlapping position and the spring module 103 has been completely installed between the first and second housings 101 and 102 of the portable terminal 100. When the spring module 103 is installed between the first and second housings 101 and 102, its one end 139$a$ is supported on the first housing 101 and the other end 139$b$ is supported on the second housing 102.

Figure 4B:
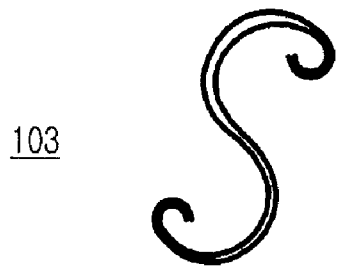
FIG. 4B is a plan view illustrating the spring module shown in FIG. 4A.

Now comparing the spring module 103 illustrated in FIG. 3 with the spring module 103 illustrated in FIG. 4B, it can be appreciated that curvatures of the first and second bends 131$a$, 133$a$, 131$b$ and 133$b$ in FIG. 4B are less than those in FIG. 3 on the whole. That is, both ends 139$a$ and 139$b$ of the spring module 103 illustrated in FIG. 4B are located closer to each other as compared with those illustrated in FIG. 3. Given that the spring module 103 has a structure providing elastic force that acts in a direction of keeping both ends 139$a$ and 139$b$ away from each other, it can be understood that elastic force is accumulated in the spring module 103 illustrated in FIG. 4B.

In the case shown in FIGS. 4A and 4B, the second housing 102 in the portable terminal 100 can move only upward in a position where second housing 102 overlaps with the first housing 101. Therefore, in the state shown in FIG. 4A, even though elastic force is accumulated in the spring module 103, the second housing 102 is maintained in the state where it overlaps with the first housing 101, and the elastic force of the spring module 103 acts as a force that restrains the second housing 102 from moving freely in the state where it overlaps with the first housing 101.

FIGS. 5A and 5B illustrates a situation in which both ends of the spring module 103 are located closest within a range where the second housing 102 can gradually move upward from the location where it overlaps with the first housing 101, especially, a range where the second housing 102 can slidingly move. While the second housing 102 slidingly moves until the second housing 102 reaches the point where both ends of the spring module 103 are located closest, from the position where the second housing 102 overlaps with the first housing 101, both ends of the spring module 103 approach each other little by little. Therefore, elastic force accumulated in the spring module 103 increases little-by-little until the second housing 102 reaches the point shown in FIG. 5A from the point in FIG. 4A (in FIG. 4A housing 102 is completely overlapped in front of housing 101 and is not shown), and the elastic force accumulated in this range will act as a driving force that moves the second housing 102 downward. In conclusion, while the second housing 102 slidingly moves between the points shown in FIGS. 4A and 5A, the elastic force of the spring module 103 acts as a driving force that moves the second housing 102 downward. Note that FIGS. 4A and 5A show the relationship between the movement of the second housing and the variation of the shape of the spring module.

FIG. 6A illustrates an example of the portable terminal according to the present invention in which the second housing 102 moves to the topside of the first housing 101, thereby opening the keypad 111 for use. If the second housing 102 passes by the point where both ends of the spring module 103 approach closest to each other, by gradually moving upward, the second housing 102 moves up to the point where the keypad 111 is fully open, by the elastic force of the spring module 103. That is, in the range from the point where both ends of the spring module 103 approach closest to each other to the point where the keypad 111 is fully open, the elastic force of the spring module 103 acts as a driving force that moves the second housing 102 upward. Therefore, in the process of opening the keypad 111 from the location where the first and second housings 101 and 102 overlap, if the user moves the second housing 102 upward only until it passes by the point shown in FIG. 5A from the point shown in FIG. 4A, the second housing 102 may move upward by the elastic force of the spring module 103 in the remaining range.

In contrast, when a user closes the keypad 111 back in the state where the keypad 111 is fully open, the user may move the second housing 102 downward until the second housing 102 passes by the point shown in FIG. 5A from the point shown in FIG. 6A. Then, the second housing 102 may move downward by the elastic force of the spring module 103 in the range between the points shown in FIG. 5A and FIG. 4A.

In this manner, it is possible to reduce thickness of the portable terminal and enable its smooth opening/closing operation by forming the spring module using a pair of asymmetric S-shaped wires in combining the first and second housings of the sliding-type portable terminal.

Figure 7:
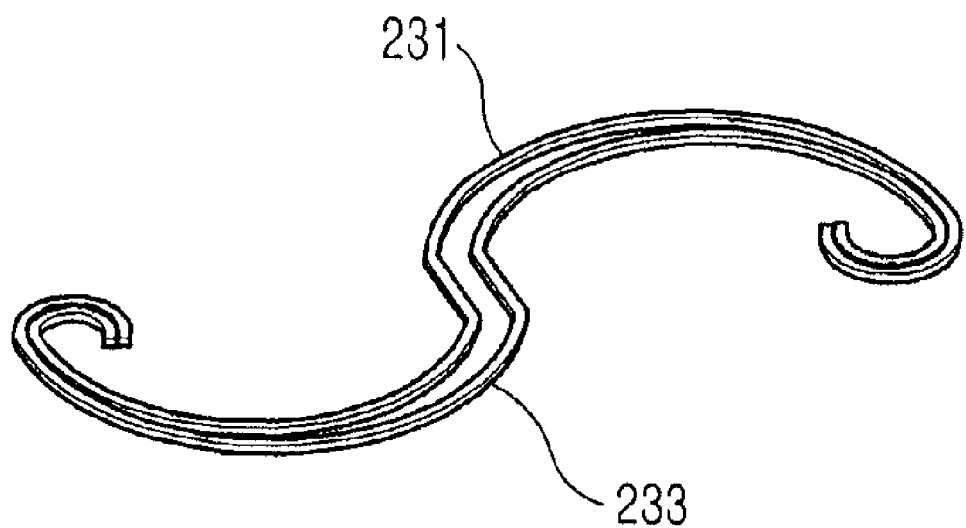
FIG. 7 is a perspective view illustrating a spring module of a portable terminal according to another exemplary embodiment of the present invention.
Figure 8:
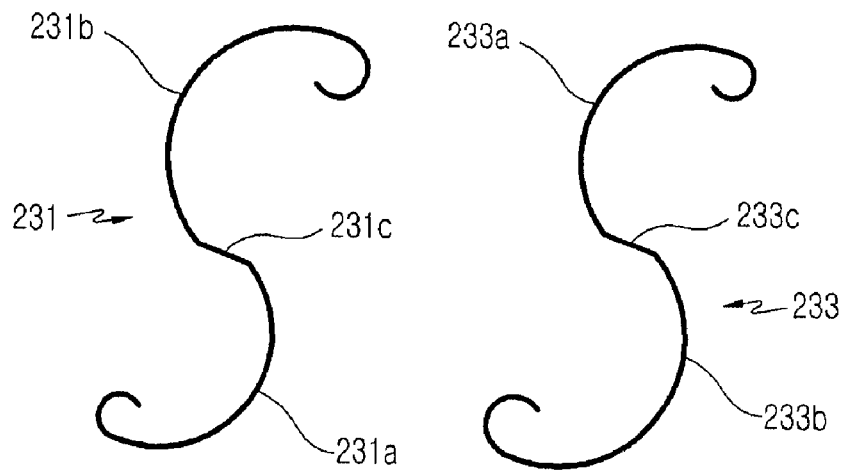
FIG. 8 is a plan view illustrating disassembled wires of the spring module shown in FIG. 7.
Figure 9:
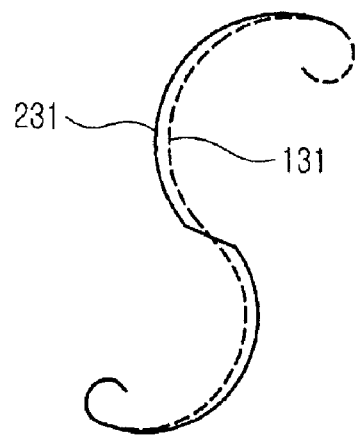
FIG. 9 is a view illustrating a comparison between the wire shown in FIG. 2 and the wire shown in FIG. 8.

FIG. 7 is a perspective view illustrating a spring module 203 according to another exemplary embodiment of the present invention. FIG. 8 is a plan view illustrating disassembled wires 231 and 233 of the spring module 203 shown in FIG. 7. FIG. 9 is a view showing a comparison between the wires 131 and 133 constituting the spring module 103 in FIG. 1 and the wires 231 and 233 constituting the spring module 203 in FIG. 7. The spring module 203 is similar to the spring module 103 in terms of the structure or the like installed on the portable terminal 100, but is different in that straight line portions 231c and 233c (show in FIG. 8) are formed between the first bends 231a and 233a and the second bends 231b and 233b.

Referring now to FIG. 8, the straight line portions 231c and 233c extend straight between the first bends 231a and 233a and the second bends 231b and 233, connecting the first bends 231a and 233a to the second bends 231b and 233b. Preferably, the straight line portions 231c and 233c is perpendicular to a straight line which connects the end portions of the spring module 103.

In this exemplary embodiment, the straight line portions 231c and 233c are formed between the first bends 231a and 233a and the second bends 231b and 233b in order to increase radiuses of curvatures of the first and second bends 231a, 233a, 231b and 233b. Therefore, extension directions of the straight line portions 231c and 233c should not necessarily being perpendicular to the straight line which connects the end portions of the spring module 103. Instead, it is enough that extension directions of the straight line portions 231c and 233c are similar to a perpendicular line to the straight line which connects the end portions of the spring module 103, that is the straight line portions 231c and 233c extend slantingly with respect to the straight line which connects the end portions of the spring module 103.

Referring now to FIG. 9, comparing this exemplary embodiment with the preceding exemplary embodiment, it can be understood that if the spring modules 103 and 203 are equal in distance between both ends, the first and second bends 231a, 233a, 231b and 233b of the spring module 203 according to this embodiment may have greater radiuses of curvatures. It may be possible by connecting the first bends 231a and 233a to the second bends 231b and 233b using the straight line portions 231c and 233c.

When the first and second housings 101 and 102 slidingly move with respect to each other, actual deformation of the spring module 203 occurs in the first and second bends 231a, 233a, 231b and 233b. Thus, if radiuses of curvatures of the first and second bends 231a, 233a, 231b and 233b are small, a stress caused by the deformation of the spring module 203 may concentrate at a particular point undesirably. In this exemplary embodiment, by forming the straight line portions 231c and 233c between the first bends 231a and 233a and the second bends 231b and 233b of the spring module 203, it is possible to secure sufficient radiuses of curvatures of the wires 231 and 233 in the limited space in the portable terminal 100, in which the spring module 203 can be mounted.

As a result, while the first and second housings 101 and 102 slidingly move, a stress caused by deformation of the spring module 203 may be uniformly distributed over the wires 231 and 233, and more specifically over the first and second bends 231a, 233a, 231b and 233b, thereby improving durability of the spring module 203.

Figure 10:
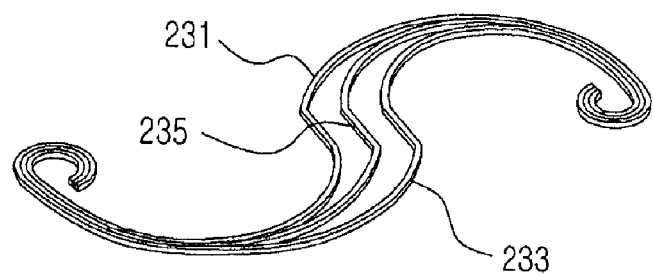
FIG. 10 is a perspective view illustrating another spring module designed by applying the spring module shown in FIG. 7.
Figure 11:
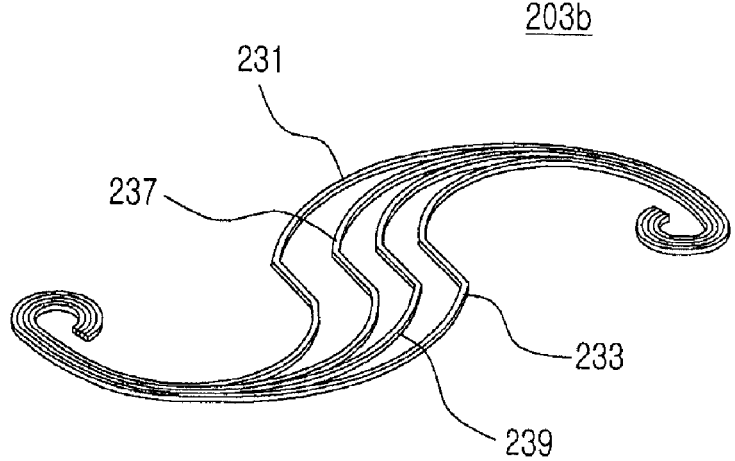
FIG. 11 is a perspective view illustrating a further another spring module designed by applying the spring module shown in FIG. 7.

In making the spring module by combining the elastic wires, it is not necessary to manufacture the spring module with a pair of wires. FIGS. 10 and 11 illustrate spring modules manufactured using three wires and four wires, respectively.

A spring module 203a illustrated in FIG. 10 is an example given by placing another wire between a pair of wires, and is made by further installing a third wire to the spring module illustrated in FIG. 7. Accordingly, in the following description of alternative embodiments below, the same drawing reference numerals will be assigned to the same elements, features and structures as those in the embodiments described above.

Regarding the structure of the spring module 203a illustrated in FIG. 10, a third wire 235 is arranged between first and second wires 231 and 233, and the third wire 235 has a symmetrical S-shape with two bends having the same curvature. In this embodiment, the two bends are connected to each other through a straight line portion. Of the two bends, one bend is arranged to wrap up a first bend of the first wire 231 and to be wrapped up by a second bend of the second wire 233, and the other bend is arranged to wrap up a first bend of the second wire 233 and to be wrapped up by a second bend of the first wire 231. As a result, in the final product, the spring module 203a also has a symmetrical S-shape.

A spring module 203b illustrated in FIG. 11 is an example given by placing another pair of wires between a pair of wires, and is manufactured by further installing third and fourth wires 237 and 239 to the spring module illustrated in FIG. 7. The third and fourth wires 237 and 239 each have third and fourth bends, and the fourth bend is connected to the third bend and has a greater curvature than the third bend. Therefore, the third and fourth wires 237 and 239 each have an asymmetrical S-shape. Also, in the spring module 203b of this embodiment, the third and fourth bends are connected to each other through a straight line portion. When the third and fourth wires 237 and 239 are combined with each other, a third bend of the third wire 237 is arranged to be wrapped up by a fourth bend of the fourth wire 239 while a fourth bend of the third wire 237 is arranged to wrap up a third bend of the fourth wire 239. Therefore, a combined shape of the third and fourth wires 237 and 239 is a symmetrical S-shape.

As the spring module 203b is manufactured by arranging the third and fourth wires 237 and 239 between the first and second wires 231 and 233, the final spring module 203b may have a symmetrical S-shape.

As described above, the spring modules according to the present invention are manufactured by combining at least one pair of asymmetrical S-shaped wires, and in alternative embodiments, at least one other wire is interposed between the one pair of wires, so the whole spring module has a symmetrical S-shape. The number of wires constituting the spring module can be properly determined by those skilled in the art, considering possible elastic force provided by each wire and required elastic force of the spring module in the actual product.

FIGS. 12 through 21 illustrate different structures for coupling the spring module 203 to housings of a portable terminal.

In different embodiments illustrated in FIGS. 12 through 21, support members made of a synthetic resin material or a metallic material are installed on both ends of the spring module 203, and coupling members such as rivets are provided or support protrusions are formed on the support members to fit the support members to the housings of the portable terminal.

In the embodiment illustrated in FIGS. 12A to 13C, support members 23a made of a synthetic resin material are installed on both ends of the spring module 203, and coupled to the housings of the portable terminal using rivets 27a.

Figure 12A:
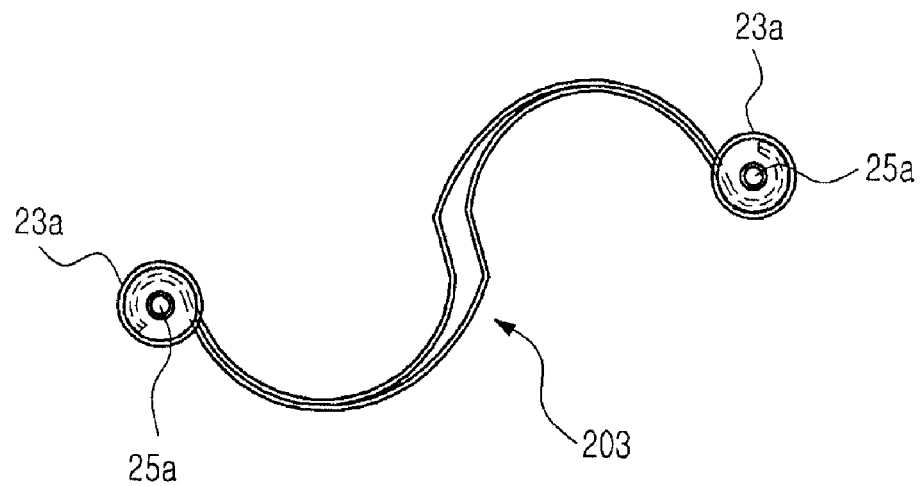
FIGS. 12A and 12B illustrate a first method of combining the spring module shown in FIG. 7.
Figure 12B:
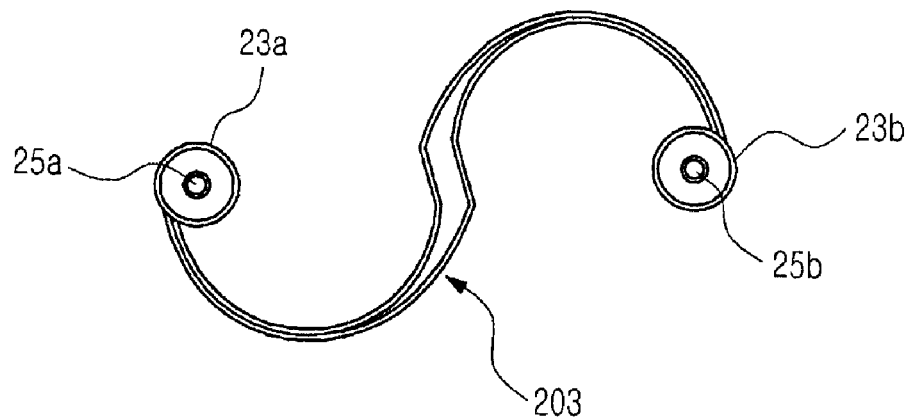

When the support members 23a are made of synthetic resins, the support members 23a can fixed to both ends of the spring module 203 while being molded by insert molding. FIG. 12A shows the features that both ends of the spring module 203 are located within the support members 23a by molding the support members 23a by insert molding. FIG. 12B shows the features that both ends of the spring module 203 moved close to each other.

Figure 13A:
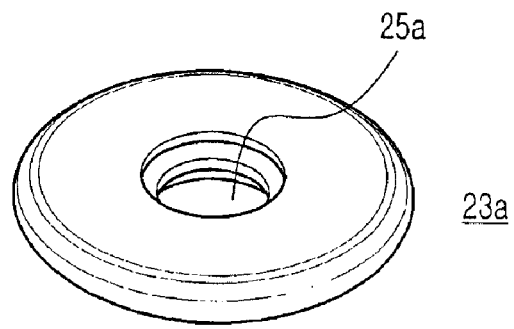
FIGS. 13A to 13C illustrate the support member and the rivet for coupling the support member, which are shown in FIGS. 12A and 12B.
Figure 13B:
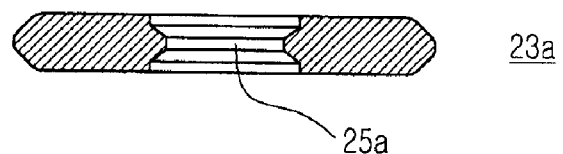
Figure 13C:
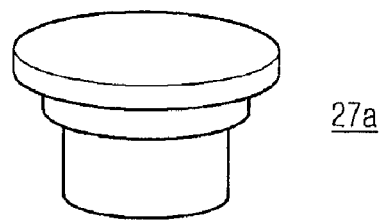
Figure 14A:
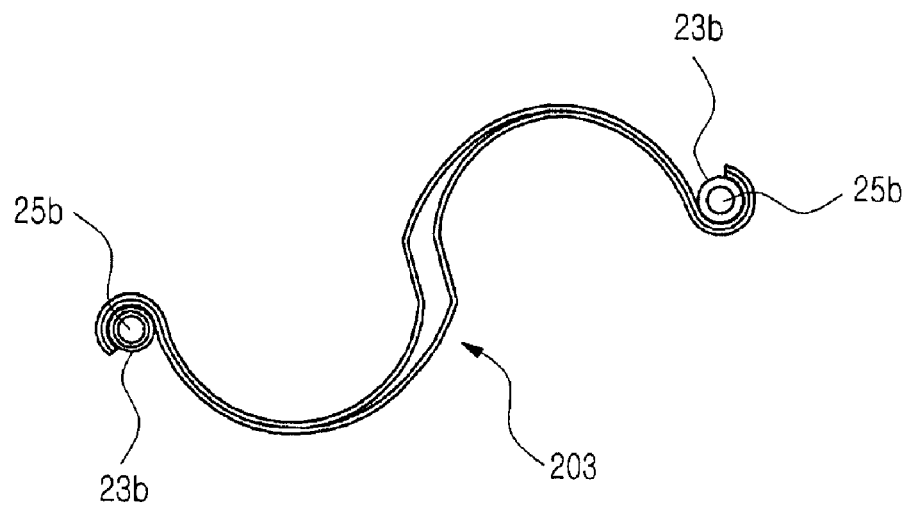
FIGS. 14A and 14B illustrate a second method of combining the spring module shown in FIG. 7.
Figure 14B:
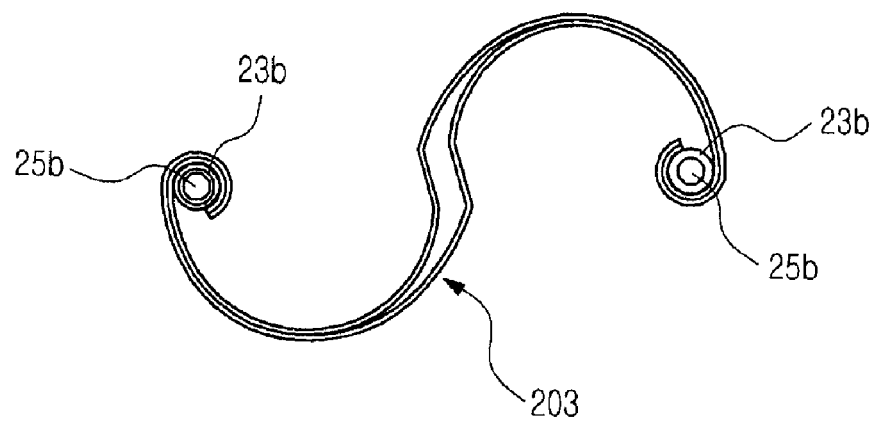
Figure 15A:
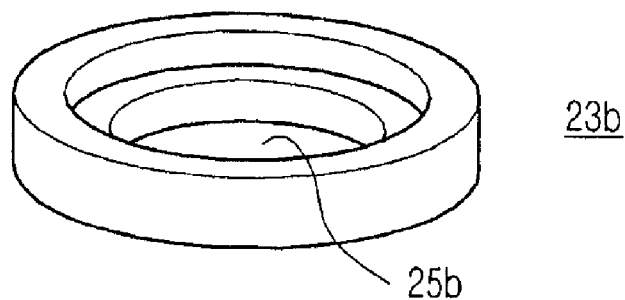
FIGS. 15A and 15B illustrate the support member shown in FIGS. 14A and 14B.
Figure 15B:
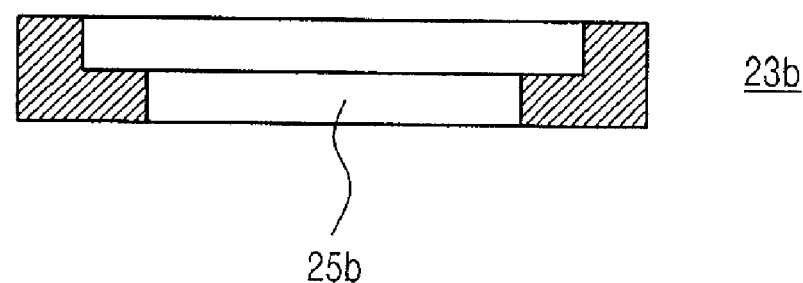
Figure 16A:
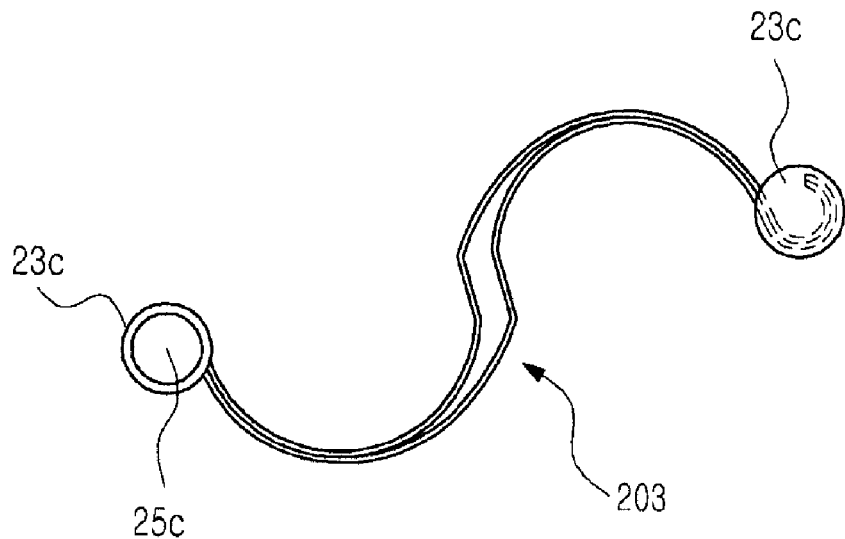
FIGS. 16A and 16B illustrate a third method of combining the spring module shown in FIG. 7.
Figure 16B:
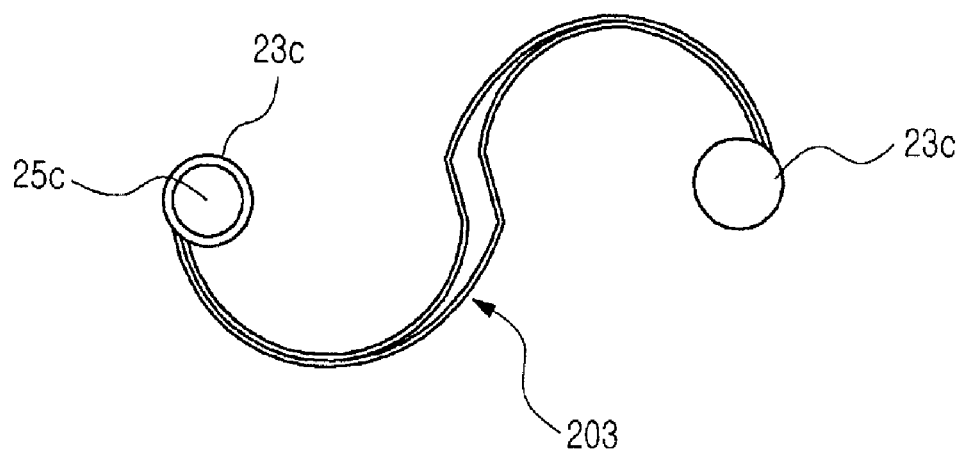

FIGS. 13A and 13B illustrate a shape of the support member 23a, which is not coupled to the spring module 203. A support hole 25a through which the rivet 27a (shown in FIG. 13C) passes is formed in the support member 23a, passing through both sides thereof, and a stepped surface is formed on the support hole 25a so that a head portion of the rivet 27a can be supported. To secure sufficient coherence between the wires 231 and 233 and the support members 23a, both ends of the spring module 203 can be arranged to surround the support holes 25a within the support members 23a.

FIGS. 14A through 15B illustrate an example in which support members 23b made of a metallic material are installed on both ends of the spring module 203, and are engaged to the housings of the portable terminal using the rivets 27a. When the support members 23b are made of a metallic material, both ends of the spring module 203 are preferably welded after arranged to wrap up the outer circumferential surface of the support members 23b. Support holes 25b are formed in the support members 23b, passing through both sides of each of the support holes 25b, and a stepped surface is formed on the support holes 25b so that head portions of the rivets 27a can be supported.

Figure 17A:
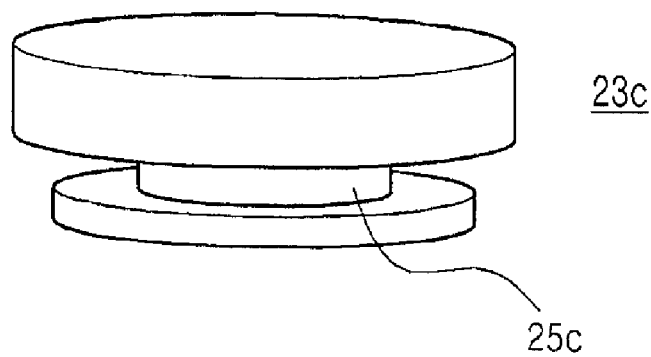
FIGS. 17A and 17B illustrate the support member shown in FIGS. 16A and 16B and coupling holes to which the support member is coupled.
Figure 17B:
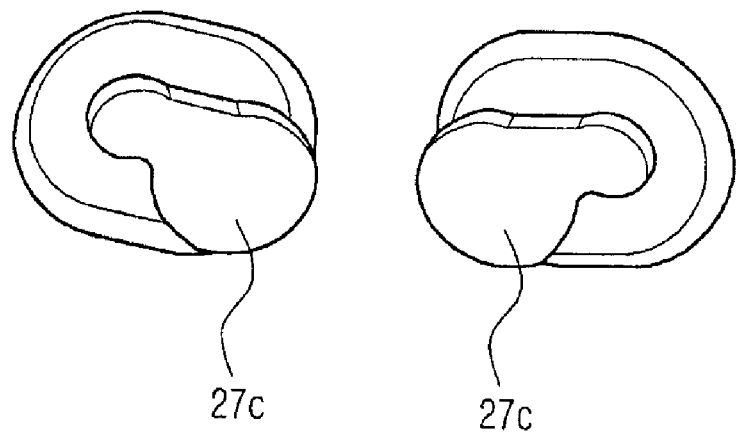

FIGS. 16A to 17B illustrate an example in which support members 23c are made of a synthetic resin material and a support protrusion 25c is formed on one side of the support members 23c. The support members 23c are also combined and fixed to both ends of the spring module 203 while being molded by insert molding. If the support protrusion 25c on one end of the spring module 203 is installed to face one direction, a protrusion on the other end is installed to face the opposite direction. FIG. 17B illustrates coupling holes 27c to which the support protrusion 25c is coupled. The coupling holes 27c are formed in the housings of the portable terminal.

The support protrusion 25c is assembled into the coupling holes 27c through the portions having a greater diameter, and the support protrusion 25c is engaged with the portions having a smaller diameter on the coupling holes 27c by elastic force of the spring module 203 after the support protrusion 25c is accommodated in the coupling holes 27c. That is, the larger-diameter portions and the smaller-diameter portions are connected to each other on the coupling holes 27c. The support members 23c can be assembled through the larger-diameter portions, and after the assembly, the support protrusion 25c is supported at the smaller-diameter portions on the coupling holes 27c.

Figure 18A:
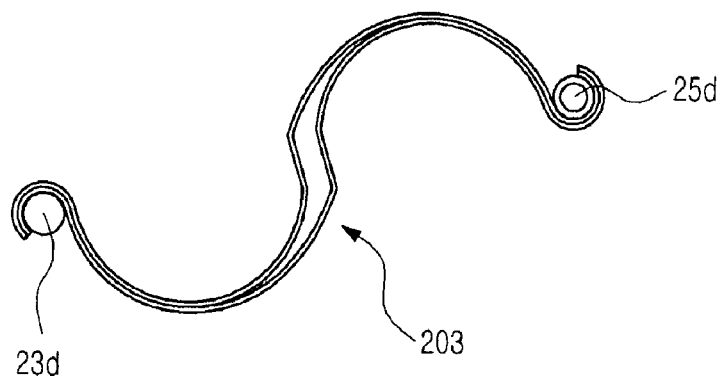
FIGS. 18A and 18B illustrate a fourth method of combining the spring module shown in FIG. 7.
Figure 18B:
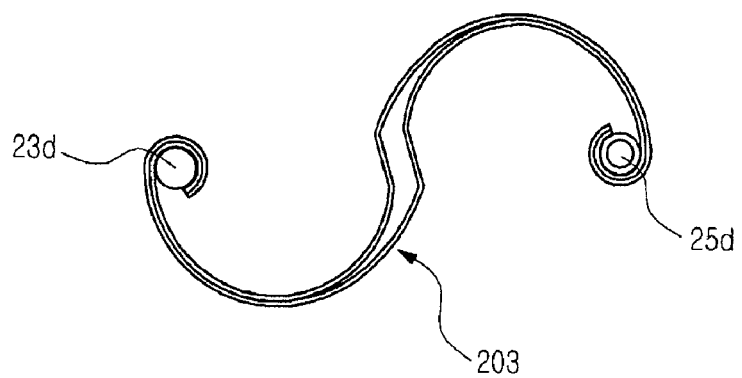
Figure 19:
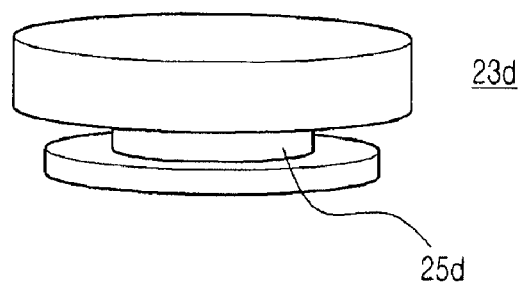
FIG. 19 illustrates the support member shown in FIGS. 18A and 18B.

FIGS. 18A to 19 illustrate an example in which support members 23d are made of a metallic material, and a support protrusion 25d is formed on one side of the support members 23d. As both ends of the spring module 203 are welded after arranged to wrap up the support members 23d, the support members 23d are fixed to the spring module 203.

A structure of installing the spring module 203 in the portable terminal using the support members 23d shown in FIGS. 18A to 19 is similar to the structure illustrated in FIGS. 16A to 17B, so a detailed description thereof is omitted herein.

Figure 20A:
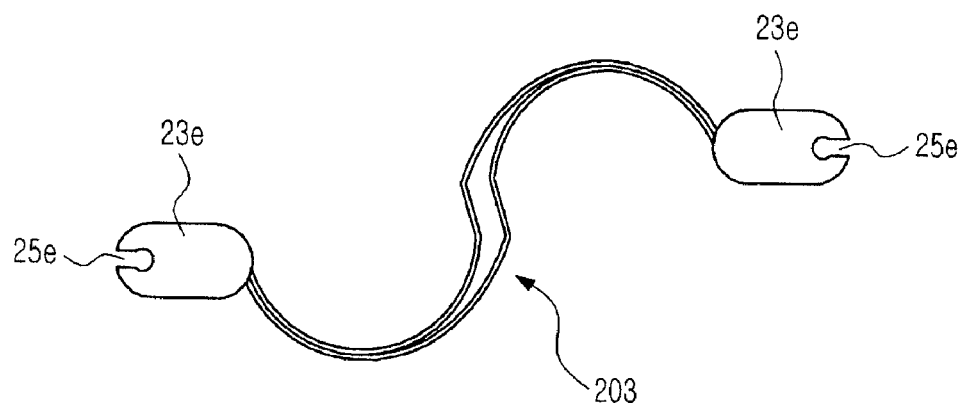
FIGS. 20A and 20B illustrate a fifth method of combining the spring module shown in FIG. 7.
Figure 20B:
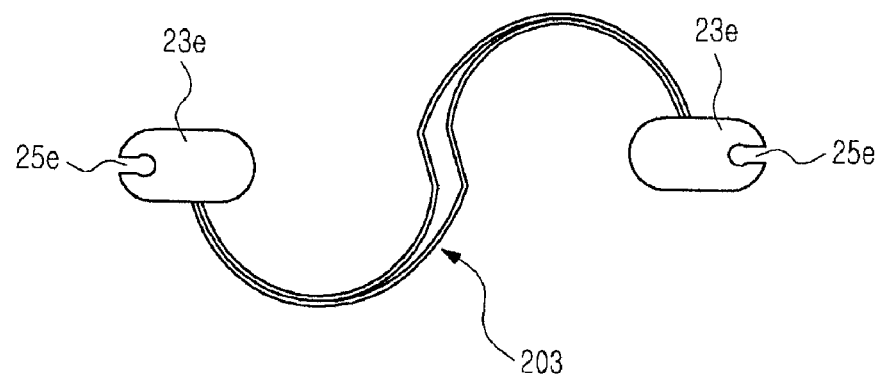
Figure 21:
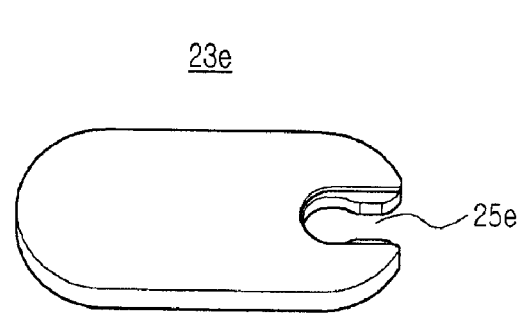
FIG. 21 illustrates the support member shown in FIGS. 20A and 20B.

FIGS. 20A to 21 illustrate an example in which support members 23e are molded using synthetic resins, and support holes 25e extend from the edges on one sides of the support members 23e. If the spring module 203 is mounted in the portable terminal after the installation of the support members 23e, the rivets fixed to the housings of the portable terminal are coupled to the support holes 25e. To be more specific, the rivets are supported on inner walls of inner ends of the support holes 25e. As the inner ends of the support holes 25e have a greater diameter than other portions, the rivets can be well accommodated therein. Preferably, the remaining portions of the support holes 25e, excluding the portions that substantially accommodate the rivets, have a gap slightly less than the diameter of the rivets. This is to prevent the support members 23e from being detached from the rivets, and ensure the smooth opening/closing operation of the portable terminal. That is, during the opening/closing operation of the portable terminal, the support members 23e rotate about the rivets fixed to the housings of the portable terminal, and the gap contributes to reducing the friction generated during the rotation, guaranteeing the smooth rotation of the support members 23e.

In the foregoing description of the exemplary installation structure for the spring module using such support members, the support members with support holes 25a, 25b and 25e formed thereon are coupled to the housings of the portable terminal using the coupling members such as rivets. However, if protrusions that can be coupled to the support holes are provided on the housings of the portable terminal, it is not necessary to use separate coupling members.

As is apparent from the foregoing description, the spring module for a portable terminal according to the present invention provides for reduced thickness in the portable terminal, and is particularly beneficial to a sliding-type portable terminal. In addition, it is also possible to provide sufficient elastic force while reducing the thickness, thereby enabling a smooth opening/closing operation of the sliding-type portable terminal.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
a first housing;
a second housing coupled to the first housing face-to-face; in which said second housing is linearly movable while facing the first housing; and
a spring module arranged such that one end of the spring module is supported on the first housing, and another end of the spring module is supported on the second housing,
wherein said spring module comprising a plurality of individually asymmetrical S-shaped wires, each of the wires including a first bend and a second bend extending from the first bend that has a greater curvature than the first bend, wherein each one of at least a pair of the plurality of asymmetrical S-shaped wires forms a symmetrical S-shape when connected with another asymmetrically S-shaped wire.

2. The portable terminal of claim 1, wherein the spring module is formed by arranging at least a pair of the wires together so as to come in contact at their end portions in a pair.

3. The portable terminal of claim 2, wherein the second bend of a first wire of the S-shaped wires is arranged to wrap up the first bend of a second wire of the wires, and the second bend of the second wire is arranged to wrap up the first bend of the first wire.

4. The portable terminal of claim 1, wherein when the asymmetrical S-shaped wires are attached to each other, the spring module has a symmetric S-shape.

5. The portable terminal of claim 2, wherein when the asymmetrical S-shaped wires are attached to each other, the spring module has a symmetric S-shape.

6. The portable terminal of claim 1, wherein cross sections of the S-shaped wires are rectangular.

7. The portable terminal of claim 1, wherein the second bend of each respective wire extends from one end of the first bend.

8. The portable terminal of claim 1, wherein a linear movement of the second housing relative to the first housing changes curvatures in the first and second bends of the spring module so as to change an elastic force accumulated in the spring module.

9. The portable terminal of claim 2, wherein a linear movement of the second housing relative to the first housing changes curvatures in the first and second bends of the spring module so as to change an elastic force accumulated in the spring module.

10. The portable terminal of claim 2, wherein both ends of the spring module approach/move away from each other when curvatures of the first and second bends change by the linear movement of the second housing.

11. The portable terminal of claim 8, wherein both ends of the spring module approach/move away from each other when curvatures of the first and second bends change by the linear movement of the second housing.

12. The portable terminal of claim 8, wherein the spring module is arranged to provide an elastic force that acts in a direction of keeping both ends away from each other.

13. The portable terminal of claim 1, wherein each of the wires further includes a straight line portion extending between the first and second bends that connects the first and second bends to each other.

14. The portable terminal of claim 13, wherein the spring module is arranged to provide an elastic force that acts in a direction of keeping both ends away from each other.

15. The portable terminal of claim 13, wherein the straight line portion extends perpendicularly to a straight line which connects the end portions of the spring module.

16. The portable terminal of claim 13, wherein the straight line portion is slantingly to a straight line which connects the end portions of the spring module.

17. The portable terminal of claim 3, wherein the spring module further comprises a third wire interposed between the first and second wires.

18. The portable terminal of claim 17, wherein the third wire has two bends having a same curvature, and each of the bends of the third wire is arranged to wrap up a first bend of any one of the first and second wires and to be wrapped up by a second bend of another one of the first and second wires.

19. The portable terminal of claim 17, wherein the third wire has two bends having a same curvature, and the bends of the third wire are connected to each other by a straight line portion extending straight therebetween.

20. The portable terminal of claim 3, wherein the spring module further comprises third and fourth wires, which are interposed in a pair between the first and second wires.

21. The portable terminal of claim 20, wherein each of the third and fourth wires is an asymmetrical S-shaped wire which includes a third bend, and a fourth bend that is connected to the third bend and has a greater curvature than the third bend.

22. The portable terminal of claim 21, wherein the spring module is arranged such that the fourth bend of the third wire wraps up the third bend of the fourth wire, and the fourth bend of the fourth wire wraps up the third bend of the third wire.

23. The portable terminal of claim 21, wherein when the first, second, third and fourth wires are connected to one other, the spring module has a symmetrical S-shape.

24. The portable terminal of claim 3, wherein the spring module further comprises support members provided on both ends thereof.

25. The portable terminal of claim 24, wherein the support members are made of a synthetic resin material, and fixed to both ends of the spring module by insert molding.

26. The portable terminal of claim 24, wherein the support members are made of a metallic material, and fixed to both ends of the spring module by welding.

27. The portable terminal of claim 24 wherein the spring module further comprises support holes formed to pass through both sides of the support members, and rivets coupled to pass through the support holes, wherein when the rivets are fixed to any one of the first and second housings, each end of the spring module is coupled to any one of the first and second housings.

28. The portable terminal of claim 27, wherein the support holes extend from edges on one side of the support members to inner sides of the support members.

29. The portable terminal of claim 24, wherein the spring module further comprises a support protrusion formed on one side of the support member, and when the support protrusion is coupled to any one of the first and second housings, each end of the spring module is coupled to any one of the first and second housings.

* * * * *